UNITED STATES PATENT OFFICE.

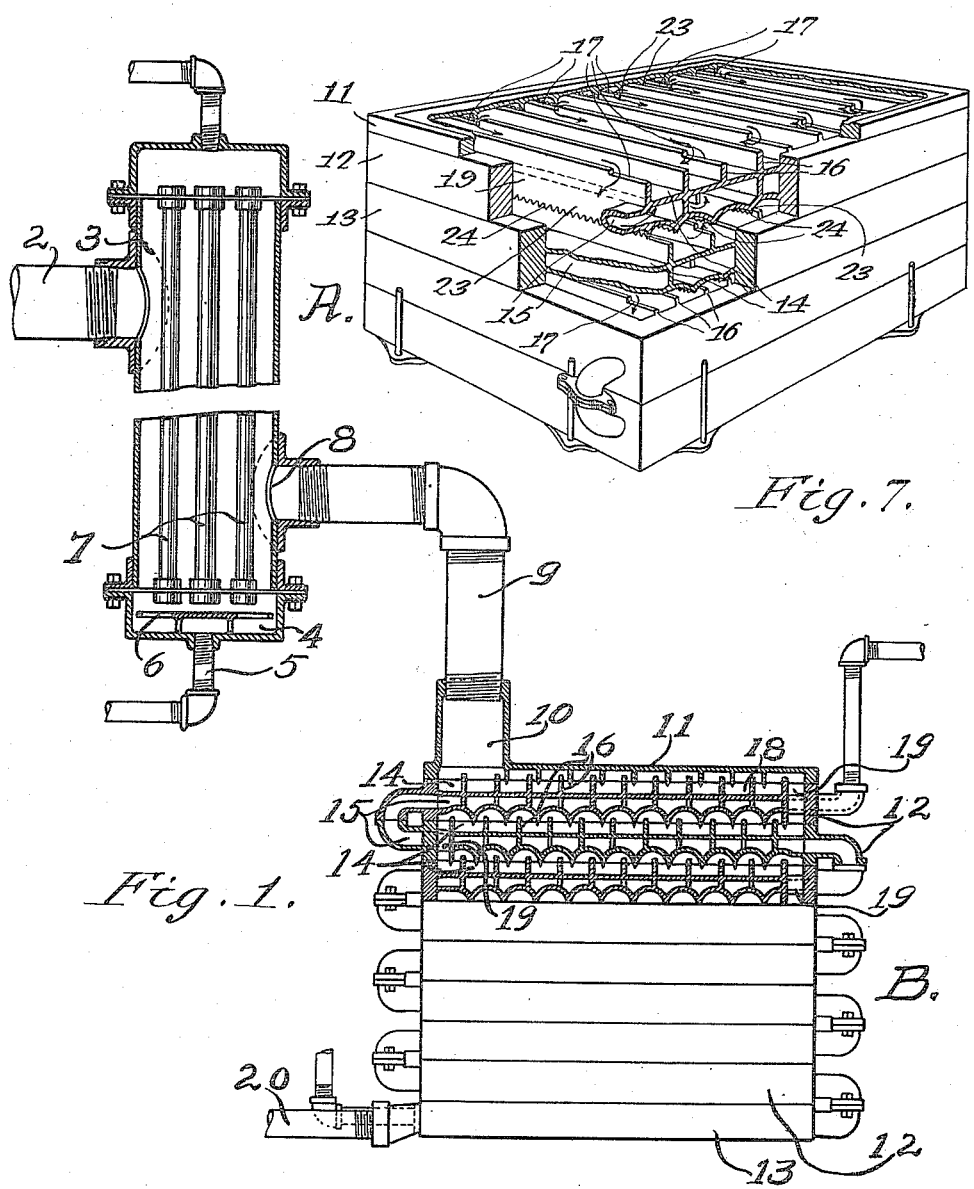

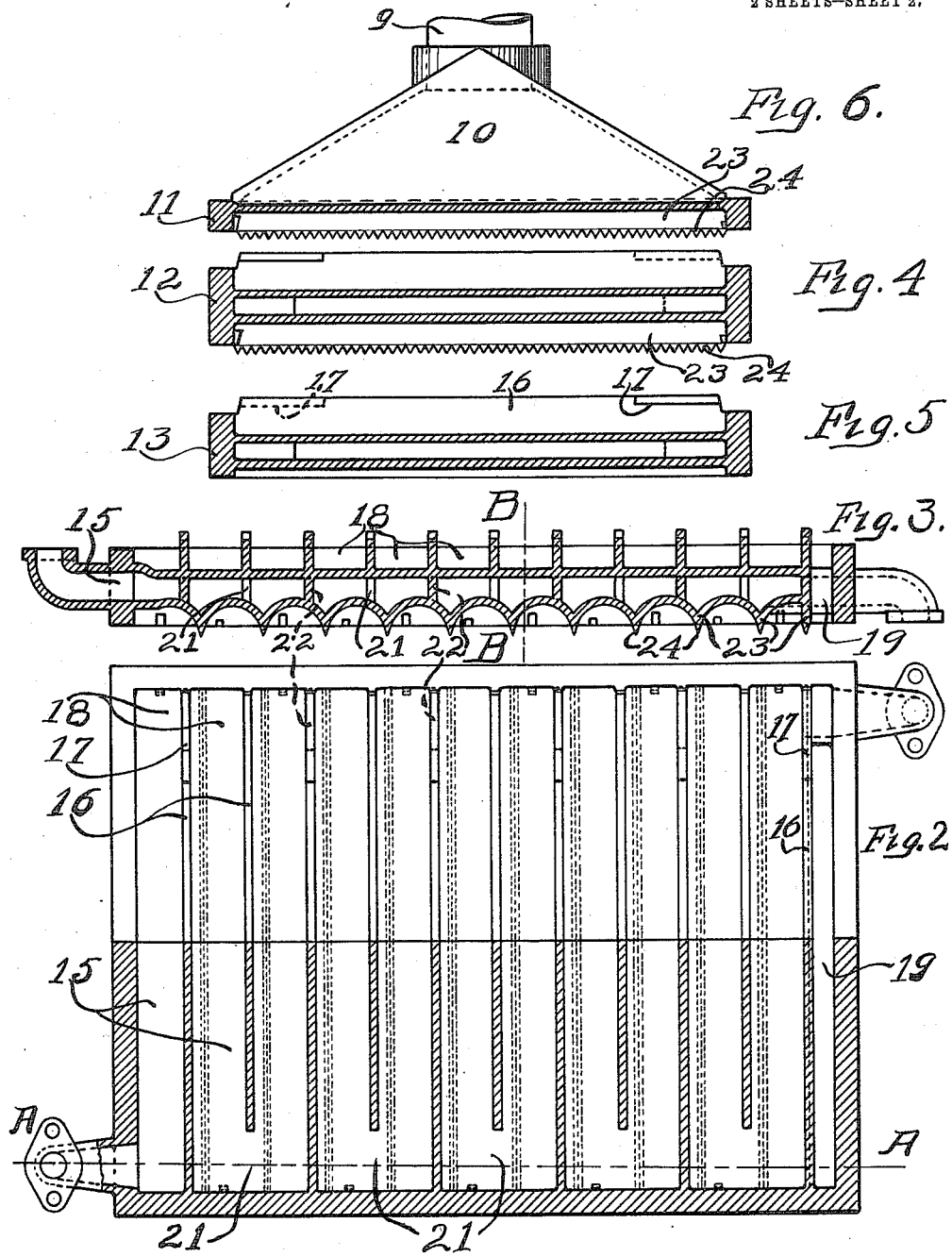

WILLIAM H. WRIGHT, OF ST. PAUL, MINNESOTA.

AMMONIA-CONCENTRATOR.

1,005,761. Specification of Letters Patent. Patented Oct. 10, 1911.

Application filed May 2, 1910. Serial No. 558,848.

*To all whom it may concern:*

Be it known that I, WILLIAM H. WRIGHT, a citizen of the United States, residing at St. Paul, in the county of Ramsey and State of Minnesota, have invented a new and useful Improvement in Ammonia-Concentrators, of which the following is a specification.

My invention relates to improvements in ammonia concentrators used in connection with ammonia distilling apparatus.

The object of my invention is to produce a highly concentrated ammonia liquor in an apparatus which is economical in first cost and in cost of operation. I secure these results in an apparatus for a two stage process by which the vapors are condensed and cooled to a temperature advantageous to absorption and at the same time above that temperature at which precipitation or "salting" might occur, and in which the final process of cooling and absorption is very much intensified by the uniform distribution of the gases to the absorbing liquor. By proportioning the different parts of my machine to the relative volumes of the gases and the condensate passing through them, I not only assist in the uniform distribution of the gases to the liquor but effect a great economy in the cost of the machine, by the reduction in the relative size of the absorptive apparatus. This reduction in the size of the absorptive apparatus also reduces the amount of cooling fluid required for the absorber and leads to a much more economical operation of the apparatus.

In the drawings with which I illustrate my invention, and which form part of my specification, Figure 1 is a partly sectional elevation of my concentrator showing the relation of the parts; Fig. 2 is a partly sectional plan of one segment of my absorber; Fig. 3 is a section on the line A—A Fig. 2; Fig. 4 is a section on the line B—B Fig. 3; Fig. 5 is a similar section in the bottom segment of the absorber; Fig. 6 is a section of the top segment or cover of my absorber showing in elevation the connection to the condenser; and Fig. 7 is a view in perspective of my invention, part thereof being broken away to expose a portion of the interior.

In these illustrations the same numeral indicates identical parts in the different views.

Referring to my device as I have illustrated it in the foregoing figures, A is an ordinary water-cooled condenser connected to the water-cooled absorber B of special construction. These two elements acting in combination, form my invention. In the condenser A the ammonia vapors from ammonia distilling apparatus are received through the pipe 2 into the chamber 3. Cool water is admitted to the chamber 4 through the pipe 5 where it is distributed by the baffle plate 6 and passes upward through the tubes 7 lying in the chamber 3. The hot vapors passing downward about the cooled tubes 7, are cooled and condensed and pass out through the opening 8 whence they are conducted by the pipe 9 to the hood 10 of the absorber B.

The absorber B is made up of a series of rectangular segments 11, 12 and 13, resting one above the other, having connected passages 14 between them for the flow of the condensate, and connected passages 15 within them for the flow of water through the absorber. In the passageways 14 for the flow of the condensate, the upper floor of the intermediate and bottom segments 12 and 13 is divided by a series of dams 16 having weirs 17 at alternate ends, into a corresponding number of narrow canals 18. By this arrangement the liquors entering at one side of a given segment, or condensing from the vapors in transit over the segment, are forced to flow back and forth from one end of each canal to the other till the opposite side of the segment is reached, where it flows over the last weir down through a passage 19 into the first canal of the next lower segment. This course is followed through the various segments till the bottom of the absorber is reached whence the liquor flows through any suitable pipe 20. During its travel the liquor is constantly cooled by water or other cooling medium flowing through the passages 15 in the interior of the segments. These passages correspond approximately in number and location with the liquor canals 14. The partitions which form these compartments within the segment are open at alternate ends 21 and 22 and the cooling medium enters the passages in the bottom segment and follows them back and forth, upward from segment to segment in the opposite direction to the constantly descending ammonia liquor. In this way the liquor is brought in contact gradually and successively with colder and colder surfaces. Depending from the lower surface of each segment are partitions or baffle walls 23 having serrated edges 24. These partitions are parallel with the other walls of the absorber and extend down into the canals 14 between these walls and dams 16, forming in the liquor in the canals, a seal for the gases lying above the liquors. The depth of this seal is determined by the depth of the baffles and the height of the weirs 17 in the dams. As these seals extend entirely across the segments forming a series of separate parallel compartments, it is obvious that the gases and vapors which accompany the condensate from the condenser can pass through the absorber, only by breaking through the seal and passing under the baffle walls 23 from compartment to compartment of each segment and through passage 19 to the segment below where the process is repeated. In passing under the baffles 23 the gases are divided by the serrations 24 into small streams of bubbles which rise through the liquor on the far side of the baffle. In this way a very intense washing effect is obtained, the gases and vapors being forced repeatedly into the most intimate contact with the liquor.

As the gases become weaker and weaker in the desired constituents and the absorptive action slower, they are constantly and successively brought into intimate contact with colder liquor which has a constantly increasing absorptive power. Any waste gases remaining in the lowest segment 13 of the absorber may pass off with the liquor and be separated therefrom and disposed of in any desired manner. All the passageways are designed to be straight, parallel, and of uniform size, so that the liquors passing through them may have uniform flow and each unit of liquor will remain in the apparatus the same length of time. By the same uniform construction the exposure of the gas to the liquor for absorption is made uniform and the danger of overconcentration in any part of the liquor is minimized. By this means the possible degree of concentration in the liquor is greatly raised. The rectangular shape of the absorber is adapted to the construction of straight parallel canals and this together with the relatively reduced size of the absorber greatly economizes the cost of material and labor in construction.

In accordance with the patent statutes I have described the principles of operation of my invention together with the apparatus which I now consider to represent the best embodiment thereof but I desire to have it understood that the construction shown is only illustrative and that the invention can be carried out by other means and applied to uses other than those above set forth within the scope of the following claims.

Having described my invention, what I claim as new and desire to protect by Letters Patent is:—

1. An ammonia concentrator, comprising, in combination, a condenser having passageways therein through which the ammonia distillate may be conducted, and passageways through which a cooling fluid may be conducted, whereby said vapors may be cooled and partly condensed by cooling, an absorber having passageways therein adapted to pass the condensate from the condenser, and passageways adapted for the passage of a cooling fluid in proximity to said condensate passageways, and means for passing the vapors accompanying the condensate through said condensate, whereby said vapors may be cooled in contact with said condensate and absorbed thereby.

2. In an absorber, comprising, a plurality of similar superimposed segments, a plurality of parallel walls forming a continuous channel of substantially uniform cross-section and adapted to a uniform flow of liquid therein having adjacent laps separated by said walls, and means for passing vapors through the liquid in said channel in the successive laps thereof.

3. In an absorber, comprising, a plurality of similar superimposed segments, a plurality of parallel walls forming a continuous canal of substantially uniform cross-section and adapted to a uniform flow of liquid therein having laps separated by said walls, partitions depending from an adjacent segment and parallel with said first walls, and extending below the top thereof and adapted to dip into liquid in said canal laps, whereby vapors passing into said absorber with liquids are passed under said depending partitions through the liquid in successive laps of the canal, to secure an intimate contact between said vapors and liquid.

4. In an absorber-condenser, a series of superimposed segments of substantially rectangular shape having floors, a series of walls on each of said floors parallel to the sides of said segments and forming canals parallel and adjacent and connected serially at alternately opposite ends to form a continuous canal of substantially uniform cross-section and maximum length within the segment for the flow of condensate, the extremities of the continuous canals, in successive segments communicating with each other to permit the flow of condensate through the absorber.

5. An ammonia concentrator, comprising, a plurality of superimposed substantially similar segments having a plurality of parallel walls forming a continuous channel of substantially uniform cross-section and adapted to a uniform flow of condensate liquid therein having adjacent laps separated by said walls, passageways adapted for the passage of a cooling fluid in proximity to said condensate channel, and means for passing vapors through the liquid in said channel in the successive laps thereof.

6. An ammonia concentrator, comprising, a plurality of substantially similar superimposed segments having a plurality of parallel walls forming a continuous canal of substantially uniform cross-section and adapted to a uniform flow of liquid therein having laps separated by said walls, partitions depending from an adjacent segment and parallel with said first walls, and extending below the top thereof and adapted to dip into liquid in said canal laps, whereby vapors passing into said absorber with liquids are passed under said depending partitions through the liquid in successive laps of the canal, to secure an intimate contact between said vapors and liquid and a passageway adjacent to said canal for the passage of a cooling fluid in proximity to said canal, for the purposes specified.

7. An absorber-condenser, comprising, in combination, a series of superimposed segments of substantially rectangular shape having floors, a series of walls on each of said floors parallel to the sides of said segments and forming canals parallel and adjacent and connected serially at alternately opposite ends to form a continuous canal of substantially uniform cross-section and maximum length within the segment for the flow of condensate, the extremities of the continuous canals, in successive segments communicating with each other to permit the flow of condensate through the absorber and passage-ways adjacent to said canals adapted for the passage of a cooling fluid in proximity to said condensate canals.

8. A condenser-absorber, comprising a series of substantially rectangular segments superimposed upon each other, each fashioned with an upper and lower floor and an outer rim, forming the wall of the absorber, extending above and below said floors and adapted to oppose each other in successive segments and form openings between the lower and upper floors of successive segments, passageways extending through the floors of successive segments on opposite lateral sides of successive segments, connecting said openings between segments, dam walls upon the upper floors of said segments lying parallel to the sides of said segments and adapted to form canals on said floors, weirs in said dam walls, at opposite alternate ends of successive walls, adapted to connect said canals and direct the flow of liquor back and forth through the length of the canals, across the segments; whereby a depth of liquor is adapted to be maintained upon the floor of the segment and drained into the next lower segment as it accumulates from the next segment above, baffle walls depending from the lower floors of the top and intermediate segments into said canals and adapted to form a liquid seal with the liquors maintained in the canal; whereby vapors accompanying said liquor are forced to pass under said baffles and through said liquor in passing through the absorber, teeth depending from said baffles forming notches adapted to divide said escaping vapors into small streams, whereby said vapors are adapted to be brought into intimate contact with said liquor, partitions between said upper and lower floors of each segment disposed substantially parallel with said liquor canals and adapted to direct the flow of cooling fluid through said segments in substantially the same course as the condensate liquor and vapors, and passageways connecting said compartments of the successive segments, adapted to pass a cooling fluid through the absorber, whereby the condensate liquor is adapted to be cooled and thus rendered more and more absorptive as it passes through the absorber and the vapors and gases accompanying it are adapted to be cooled and thus partly condensed and to be further absorbed by the absorptive liquor.

In testimony whereof, I have signed my name to this specification, in the presence of two subscribing witnesses.

WILLIAM H. WRIGHT.

Witnesses:
J. P. WEIR,
A. FELDMAN.